(12) United States Patent
Iwasa et al.

(10) Patent No.: US 12,291,264 B2
(45) Date of Patent: May 6, 2025

(54) DRIVING SUPPORT DEVICE, CONTROL METHOD, AND PROGRAM

(71) Applicant: HONDA MOTOR CO., LTD., Tokyo (JP)

(72) Inventors: Tatsuya Iwasa, Wako (JP); Haruko Okuyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 18/110,382

(22) Filed: Feb. 16, 2023

(65) Prior Publication Data

US 2023/0294768 A1 Sep. 21, 2023

(30) Foreign Application Priority Data

Mar. 18, 2022 (JP) ................................ 2022-044742

(51) Int. Cl.
| | |
|---|---|
| *B60W 30/12* | (2020.01) |
| *B60W 40/08* | (2012.01) |
| *B62D 6/00* | (2006.01) |
| *B62D 6/10* | (2006.01) |
| *B62D 15/00* | (2006.01) |
| *B62D 15/02* | (2006.01) |

(52) U.S. Cl.
CPC ........... *B62D 15/025* (2013.01); *B62D 6/001* (2013.01); *B62D 6/10* (2013.01); *B62D 15/0265* (2013.01)

(58) Field of Classification Search
CPC ......... B60W 30/12; B60W 40/08; B62D 6/10; B62D 15/025; B62D 15/0265
USPC ...................................................... 701/41, 42
See application file for complete search history.

(56) References Cited

U.S. PATENT DOCUMENTS

| | | | | |
|---|---|---|---|---|
| 8,564,424 | B2 * | 10/2013 | Evarts ................... | B62D 1/046 340/576 |
| 9,248,851 | B2 * | 2/2016 | Van'tZelfde ........... | B62D 1/046 |
| 11,608,088 | B2 * | 3/2023 | Karve ..................... | B62D 1/06 |
| 2012/0296528 | A1 * | 11/2012 | Wellhoefer ............. | B60Q 9/00 74/552 |
| 2018/0231976 | A1 * | 8/2018 | Singh ..................... | B60W 30/14 |
| 2022/0371660 | A1 * | 11/2022 | Yasuda ................... | B62D 15/025 |
| 2023/0288928 | A1 * | 9/2023 | Singh ..................... | B60W 60/0059 |

FOREIGN PATENT DOCUMENTS

JP 2011-020666 2/2011

* cited by examiner

*Primary Examiner* — Erick R Solis
(74) *Attorney, Agent, or Firm* — Amin, Turocy & Watson, LLP (57) ABSTRACT

A driving support device includes: a driving state monitoring portion configured to monitor a plurality of driving states including a gripping position of a steering wheel of an occupant of a vehicle; a positive value calculation portion configured to calculate a positive value indicating a degree of positiveness of the occupant with respect to steering based on the plurality of driving states monitored by the driving state monitoring portion; and a lane keep assistance control portion configured to perform lane keep assistance control of guiding a steering operation of the occupant so that the vehicle does not deviate from a traveling lane based on the positive value calculated by the positive value calculation portion.

7 Claims, 5 Drawing Sheets

PERFORM NO CONTROL WHEN VEHICLE IS NOT LIKELY TO DEVIATE
FROM LANE EVEN IF VEHICLE IS NOT TRAVELING IN CENTER OF LANE,
AND PERFORM CONTROL WHEN VEHICLE IS LIKELY TO DEVIATE FROM LANE

FIG. 8

| f (POSITIVE VALUE) | SMALL | INTERMEDIATE | LARGE |
|---|---|---|---|
| CONTROL ON HIGH-SPEED ROAD | STRONG | MEDIUM | WEAK |
| CONTROL ON GENERAL ROAD | MEDIUM (GIVE WARNING TO INCREASE STEERING POSITIVENESS) | MEDIUM | WEAK |

FIG. 9

DRIVING SUPPORT DEVICE, CONTROL METHOD, AND PROGRAM

CROSS-REFERENCE TO RELATED APPLICATION

Priority is claimed on Japanese Patent Application No. 2022-044742, filed on Mar. 18, 2022, the contents of which are incorporated herein by reference.

BACKGROUND

Field of the Invention

The present invention relates to a driving support device, a control method, and a program.

Background

Conventionally, there is a technology of providing a pressure sensor in a steering wheel and changing a strength of lane control assistance depending on a gripping position of a driver (for example, refer to Japanese Unexamined Patent Application, First Publication No. 2011-20666).

SUMMARY

In the conventional technology described above, since a strength of control is determined depending on the gripping position of a driver, there is a possibility that the lane control assistance may be stronger against an intention of the driver.

An object of an aspect of the present invention is to provide a driving support device, a control method, and a program capable of accurately determining the state of a driver and performing accurate lane control assistance.

A driving support device according to a first aspect of the present invention includes: a driving state monitoring portion configured to monitor a plurality of driving states including a gripping position of a steering wheel of an occupant of a vehicle; a positive value calculation portion configured to calculate a positive value indicating a degree of positiveness of the occupant with respect to steering based on the plurality of driving states monitored by the driving state monitoring portion; and a lane keep assistance control portion configured to perform lane keep assistance control of guiding a steering operation of the occupant so that the vehicle does not deviate from a traveling lane based on the positive value calculated by the positive value calculation portion.

A second aspect is the driving support device according to the first aspect described above, wherein the driving state monitoring portion may monitor an operation of the steering wheel in a forward-rearward direction as the driving state, the positive value calculation portion may calculate a larger positive value when the steering wheel is operated in a forward direction than when the steering wheel is not operated in the forward direction, and the lane keep assistance control portion may make the lane keep assistance control weaker when the positive value is large than when the positive value is small.

A third aspect is the driving support device according to the first or the second aspect described above, wherein the driving state monitoring portion may monitor a viewpoint of the occupant as the driving state, the positive value calculation portion may calculate a larger positive value when a frequency of viewpoints of the occupant in a predetermined direction is high than when a frequency of viewpoints of the occupant in the predetermined direction is low, and the lane keep assistance control portion may make the lane keep assistance control weaker when the positive value is large than when the positive value is small.

A fourth aspect is the driving support device according to any one of the first to the third aspects described above, wherein the driving state monitoring portion may monitor a load value that acts on an armrest, the positive value calculation portion may calculate a smaller positive value when the load value is large than when the load value is small, and the lane keep assistance control portion may make the lane keep assistance control weaker when the positive value is large than when the positive value is small.

A fifth aspect is the driving support device according to any one of the first to the fourth aspects described above, wherein the lane keep assistance control portion may make the lane keep assistance control stronger when the positive value is equal to or less than a predetermined value and the vehicle is traveling on a high-speed road than when the positive value is equal to or less than the predetermined value and the vehicle is traveling on a general road.

A control method according to a sixth aspect of the present invention includes: by a computer, monitoring a plurality of driving states including a gripping position of a steering wheel of an occupant of a vehicle; calculating a positive value indicating a degree of positiveness of the occupant with respect to steering based on the plurality of driving states; and performing lane keep assistance control of guiding a steering operation of the occupant so that the vehicle does not deviate from a traveling lane based on the positive value.

A seventh aspect of the present invention is a computer-readable non-transitory storage medium including a program that causes a computer to monitor a plurality of driving states including a gripping position of a steering wheel of an occupant of a vehicle; calculate a positive value indicating a degree of positiveness of the occupant with respect to steering based on the plurality of driving states, and perform lane keep assistance control of guiding a steering operation of the occupant so that the vehicle does not deviate from a traveling lane based on the positive value.

According to the first to seventh aspects described above, it is possible to perform accurate lane control assistance.

DESCRIPTION OF EMBODIMENTS

Hereinafter, embodiments of a driving support device, a control method, and a program of the present invention will be described with reference to the drawings.

In the following description, a driving support device 200 according to an embodiment of the present invention will be described. The driving support device 200 is a device that performs lane control assistance on the basis of a driving state. Specifically, a positiveness of an occupant (driver) to driving is quantified as a positive value, and lane control assistance is executed according to the positive value.

[Configuration of Driving Support System]

Figure 1:
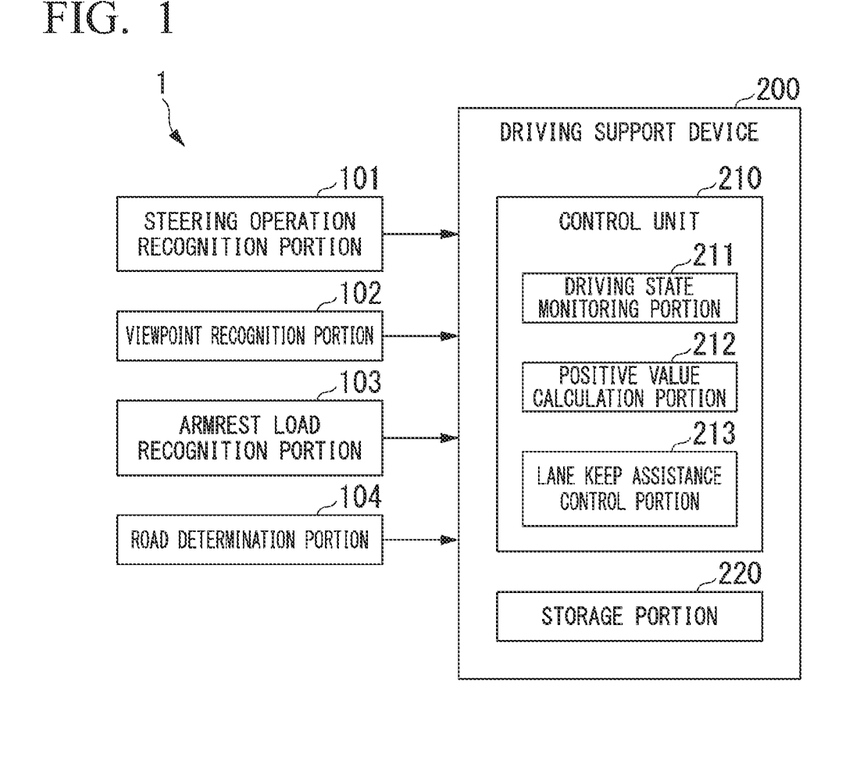
FIG. 1 is a block diagram which shows an overall configuration of a driving support system according to an embodiment of the present invention.

Hereinafter, a configuration of a driving support system 1 including a driving support device 200 will be described. FIG. 1 is a block diagram which shows an overall configuration of the driving support system 1 according to an embodiment of the present invention.

The driving support system 1 of the present embodiment is a system mounted in a vehicle (not shown). A vehicle equipped with the driving support system 1 is, for example, an electric vehicle or a vehicle equipped with an internal combustion engine such as a diesel engine or a gasoline engine. The vehicle equipped with the driving support system 1 may be a hybrid vehicle equipped with an internal combustion engine and a secondary battery that accumulates electric power for traveling to be supplied to a driving motor, or a vehicle equipped with a fuel cell that supplies electric power for traveling to a driving motor. Note that the driving support system 1 may be, for example, mounted on a moving object other than a vehicle, such as an airplane or a ship. When the driving support system 1 is mounted on a moving object other than a vehicle, it controls a route of each moving object on the basis of the driving state.

The driving support system 1 has a steering operation recognition portion 101, a viewpoint recognition portion 102, an armrest load recognition portion 103, a road determination portion 104, and a driving support device 200.

The steering operation recognition portion 101 recognizes an operation of a driver for steering. Specifically, the steering operation recognition portion 101 recognizes a gripping position of a steering wheel, a gripping pressure of the steering wheel, and a position of the steering wheel in a longitudinal direction.

Figure 2:
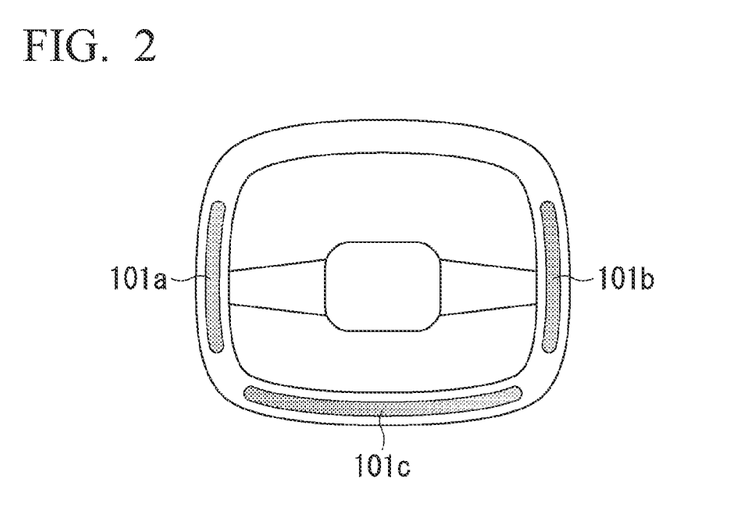
FIG. 2 is an explanatory diagram which describes a steering operation recognition portion of the driving support system.
Figure 3:
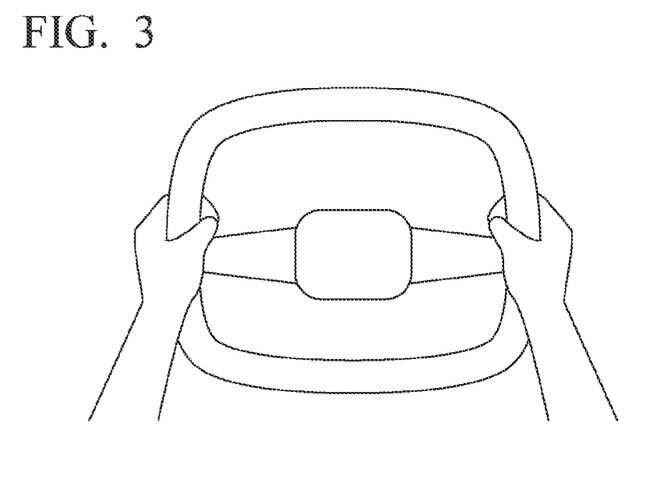
FIG. 3 is an explanatory diagram which describes the steering operation recognition portion of the driving support system.
Figure 4:
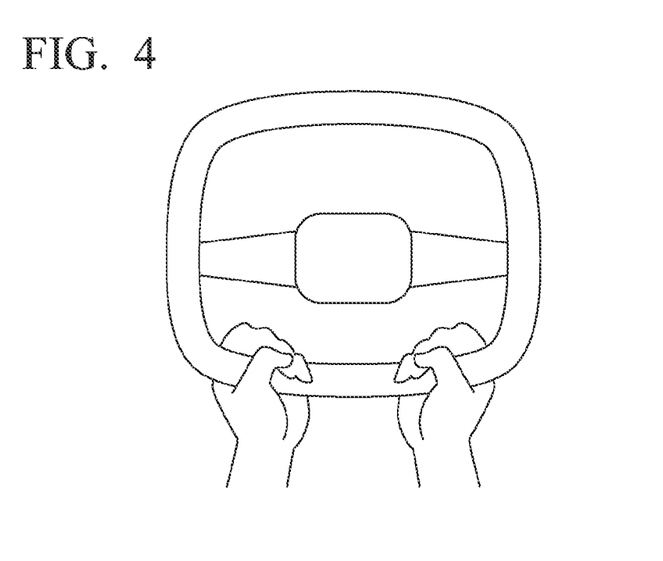
FIG. 4 is an explanatory diagram which describes the steering operation recognition portion of the driving support system.

FIGS. 2 to 5 are explanatory diagrams which describe the steering operation recognition portion 101 of the driving support system 1. As shown in FIG. 2, the steering wheel is provided with a capacitance sensor 101a, a capacitance sensor 101b, and a capacitance sensor 101c capable of detecting whether the driver is gripping each position. For example, as shown in FIG. 3, when the driver grips the steering wheel, the capacitance sensor 101c does not react, but the capacitance sensors 101a and 101b react. In addition, as shown in FIG. 4, when the driver grips the steering wheel, the capacitance sensors 101a and 101b do not react, but the capacitance sensor 101c reacts. That is, the capacitance sensors 101a, 101b, and 101c detect the gripping position at which the driver grips the steering wheel. When the gripping position at which the driver grips the steering wheel can be detected, a device that detects the gripping position at which the driver grips the steering wheel does not have to be a capacitance sensor (the device that detects the gripping position at which the driver grips the steering wheel may also be, for example, a camera).

In addition, although not shown, the steering wheel is provided with one or more pressure sensors that can detect the gripping pressure of the driver on the steering wheel. For example, it may be provided with a pressure sensor that can detect a left hand gripping pressure on the left side (a position of 6 o'clock to 12 o'clock), and a pressure sensor that can detect a right hand gripping pressure on the right side (a position of 0 o'clock to 6 o'clock).

Figure 5:
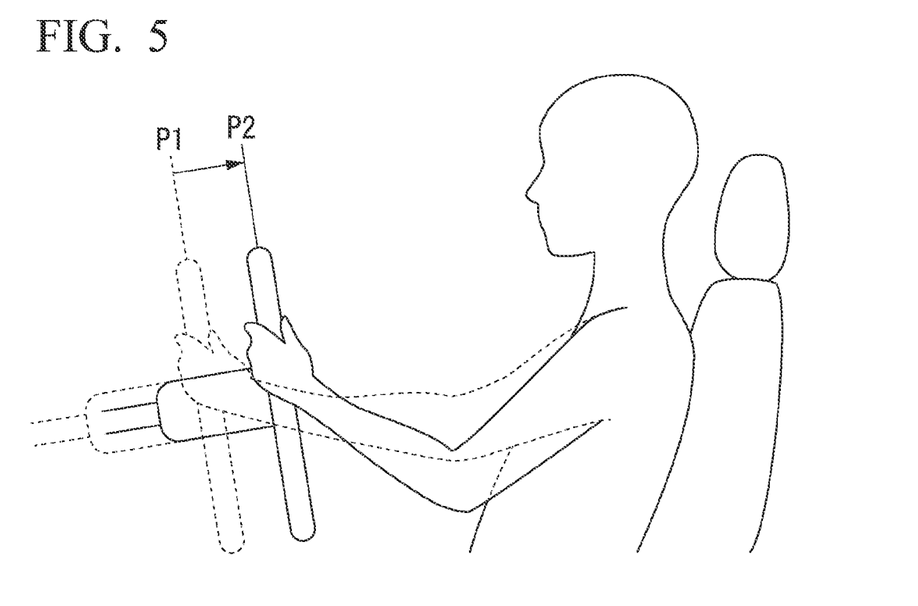
FIG. 5 is an explanatory diagram which describes the steering operation recognition portion of the driving support system.

In addition, as shown in FIG. 5, the steering wheel has a structure that can be moved in a longitudinal direction by an operation of the driver in the longitudinal direction. In other words, a position of the steering wheel is changed in the longitudinal direction depending on the operation of the driver in the longitudinal direction. For example, as shown in FIG. 5, a pulling operation of the driver changes the position of the steering wheel in the longitudinal direction from a rear side (a side farthest from a body of the driver. A position P1 in FIG. 5) to a front side (a position closer to the body of the driver. A position P2 in FIG. 5). Although not shown, the position of the steering wheel in the longitudinal direction changes from the front side to the rear side by a pushing operation of the driver. A pressure sensor (not shown) capable of detecting the position of the steering wheel in the longitudinal direction is provided. In other words, when the driver operates the steering wheel in the longitudinal direction and the position of the steering wheel in the longitudinal direction changes, the pressure sensor reacts. When the position of the steering wheel in the longitudinal direction can be detected, the device that detects the position of the steering wheel in the longitudinal direction does not have to be the pressure sensor (the device that detects the position of the steering wheel in the longitudinal direction is, for example, a camera).

The steering operation recognition portion 101 outputs results of the recognition (a gripping position of the steering wheel, a gripping pressure of the steering wheel, a position of the steering wheel in the longitudinal direction) by each sensor (a sensor that detects the gripping position of the steering wheel, a sensor that detects the gripping pressure of the steering wheel, and a sensor that detects the position of the steering wheel in the longitudinal direction) to the driving support device 200. Note that the steering operation recognition portion 101 is configured from each sensor, and results of detection by each sensor may be output to the driving support device 200 as the results of the recognition described above. Alternatively, the steering operation recognition portion 101 and each sensor are separate bodies, and the steering operation recognition portion 101 may acquire the results of the detection from each sensor and output the acquired results of the detection to the driving support device 200 as the results of the recognition described above.

The viewpoint recognition portion 102 recognizes a viewpoint of the driver (a line of sight). Specifically, the viewpoint recognition portion 102 recognizes the viewpoint of the driver in a predetermined direction (a direction of a door mirror, a direction of a rearview mirror). For example, one or more cameras are used to detect whether the viewpoint of the driver is in a predetermined direction. The viewpoint recognition portion 102 outputs results of the recognition (whether there is a viewpoint in a predetermined direction) to the driving support device 200. Note that the viewpoint recognition portion 102 may be configured from one or more cameras, and may output results of the detection by the one or more cameras to the driving support device 200 as the results of the recognition described above. Alternatively, the viewpoint recognition portion 102 and the camera may be separate bodies, and the viewpoint recognition portion 102 may acquire the results of the detection from the camera and output the acquired results of the detection to the driving support device 200 as the results of the recognition described above.

The armrest load recognition portion 103 recognizes a load acting on an armrest for the driver, that is, a load of the driver applied to the armrest. For example, the load of the driver applied to the armrest is detected by using one or more load sensors. The armrest load recognition portion 103 outputs results of the recognition (a load value of the driver applied to the armrest) to the driving support device 200. The armrest load recognition portion 103 may be configured from one or more load sensors, and may output results of the detection by one or more load sensors to the driving support device 200 as the results of the recognition described above. Alternatively, the armrest load recognition portion 103 and the load sensor are separate bodies, and the armrest load recognition portion 103 may acquire the results of the detection from the load sensors and output the acquired results of the detection to the driving support device 200 as the results of the recognition described above.

The road determination portion 104 determines a type of a road on which the vehicle is traveling (a high-speed road or a general road). The road determination portion 104 may determine the type of a road on which the vehicle is traveling by using, for example, GPS and map information. The road determination portion 104 outputs a result of the recognition (the type of a road on which the vehicle is traveling) to the driving support device 200.

The driving support device 200 includes a control unit 210 and a storage portion 220. The control unit 210 includes a driving state monitoring portion 211, a positive value calculation portion 212, and a lane keep assistance control portion 213.

These components of the control unit 210 are realized by a hardware processor such as a central processing unit (CPU) executing a program (software). Some or all of these components may be realized by hardware (a circuit part; including circuitry) such as large scale integration (LSI), an application specific integrated circuit (ASIC), a field-programmable gate array (FPGA), or a graphics processing unit (GPU), or by software and hardware in cooperation. The program may be stored in advance in a storage device (a storage device including a non-transitory storage medium) such as a hard disk drive (HDD) or flash memory, or may be stored in a removable storage medium (non-transitory storage medium) such as a DVD or CD-ROM and installed by the storage medium being attached to a drive device.

The storage portion 220 stores various programs such as control programs and application programs used by the control unit 210 for control of the driving support system 1. In addition, the storage portion 220 also stores various data used by the control program and the application program described above. The storage portion 220 is, for example, a storage medium such as an HDD or a flash memory.

Hereinafter, each configuration element of the control portion will be described.

The driving state monitoring portion 211 monitors driving states of the driver of the vehicle. The driving states include a gripping position at which the driver grips the steering wheel, a gripping pressure of the driver on the steering wheel, a position of the steering wheel in the longitudinal direction, a viewpoint of the driver in a predetermined direction, and a load of the driver applied to the armrest. Monitoring of the driving states means acquiring information on the driving states from each portion (the steering operation recognition portion 101, the viewpoint recognition portion 102, and the like), as will be described below.

The driving state monitoring portion 211 acquires the gripping position at which the driver grips the steering wheel from the steering operation recognition portion 101. That is, the driving state monitoring portion 211 monitors the gripping position at which the driver grips the steering wheel. The driving state monitoring portion 211 may determine whether the gripping position is a first gripping position (a gripping position as shown in FIG. 3, a gripping position of approximately 3 o'clock and approximately 9 o'clock) or a second gripping position (a gripping position as shown in FIG. 4, a gripping position of approximately 5 o'clock and approximately 7 o'clock). In addition to the acquisition of the gripping position from the steering operation recognition portion 101, the determination as described above may also be referred to as monitoring of the gripping position.

The driving state monitoring portion 211 acquires the gripping pressure of the driver on the steering wheel (for example, a left hand gripping pressure, a right hand gripping pressure) from the steering operation recognition portion 101. That is, the driving state monitoring portion 211 monitors the gripping pressure of the driver on the steering wheel. The driving state monitoring portion 211 may calculate a sum of the left hand gripping pressure and the right hand gripping pressure. The driving state monitoring portion 211 may also determine whether the gripping pressure (for example, the sum of the left hand gripping pressure and the right hand gripping pressure) is equal to or greater than a predetermined reference value. In addition to the acquisition of the gripping pressure from the steering operation recognition portion 101, the determination as described above may also be referred to as monitoring of the gripping pressure.

The driving state monitoring portion 211 acquires the position of the steering wheel in the longitudinal direction from the steering operation recognition portion 101. That is, the driving state monitoring portion 211 monitors the position of the steering wheel in the longitudinal direction. The driving state monitoring portion 211 may determine whether the position of the steering wheel in the longitudinal direction is on a rear side or a front side of a predetermined reference position. In addition, the driving state monitoring portion 211 may determine whether the position of the steering wheel in the longitudinal direction has changed, or whether the position of the steering wheel in the longitudinal direction has changed by a reference amount or more (that is, whether a change in the position in the longitudinal direction is equal to or greater than the reference amount). In addition to the acquisition of the position in the longitudinal direction from the steering operation recognition portion 101, the determination as described above may also be referred to as monitoring of the position in the longitudinal direction.

The driving state monitoring portion 211 acquires a presence or absence of the viewpoint of the driver in a predetermined direction (a direction of the door mirror or a direction of the rearview mirror) from the viewpoint recognition portion 102. In other words, the driving state monitoring portion 211 monitors the viewpoint of the driver in a predetermined direction. The driving state monitoring portion 211 may calculate a frequency of viewpoints in a predetermined direction (the number of instances of a viewpoint in the predetermined direction within a unit time).

Specifically, the driving state monitoring portion 211 may calculate a proportion of a visual recognition time in the predetermined direction within a predetermined time. The driving state monitoring portion 211 may separately calculate the frequency of having a viewpoint in the direction of the door mirror and the frequency of having a viewpoint in the direction of the rearview mirror. In addition to the acquisition of the presence or absence of the viewpoint in the predetermined direction from the viewpoint recognition portion 102, the calculation as described above may also be referred to as monitoring of the viewpoint in the predetermined direction.

The driving state monitoring portion 211 acquires a load value of the driver applied to the armrest from the armrest load recognition portion 103. That is, the driving state monitoring portion 211 monitors a load of the driver applied to the armrest. In addition, the driving state monitoring portion 211 may determine whether the load value applied to the armrest is equal to or greater than a predetermined reference value. In addition to the acquisition of the load value applied to the armrest from the armrest load recognition portion 103, the determination as described above may also be referred to as monitoring of the load applied to the armrest.

The positive value calculation portion 212 calculates a positive value (also referred to as a steering positive value) indicating a degree of positiveness of the driver with respect to steering on the basis of the driving state monitored (acquired, or the like) by the driving state monitoring portion 211.

The positive value calculation portion 212 calculates a larger positive value when the driver is gripping at the first gripping position (the gripping position as shown in FIG. 3) than when the driver is gripping at the second gripping position (the gripping position as shown in FIG. 4).

The positive value calculation portion 212 calculates a larger positive value when the gripping pressure of the driver is large than when the gripping pressure of the driver is small.

The positive value calculation portion 212 calculates a larger positive value when the steering wheel is operated in the longitudinal direction (specifically, the forward direction) than when the steering wheel is not operated in the longitudinal direction (specifically the forward direction). That is, the positive value calculation portion 212 calculates a larger positive value when the position of the steering wheel is on the front side (the position P2 in FIG. 5) than when the position of the steering wheel is on the rear side (the position P1 in FIG. 5).

The positive value calculation portion 212 calculates a larger positive value when the frequency of having a viewpoint in a predetermined direction (the direction of the door mirror or the direction of the rearview mirror) is high than when the frequency of having a viewpoint in the predetermined direction is low.

The positive value calculation portion 212 calculates a smaller positive value when a load value of the driver applied to the armrest is large than when the load value of the driver applied to the armrest is small.

For example, the positive value calculation portion 212 may calculate a positive value f by the following equation (Equation 1).

$$f = a1x1 + a2x2 + a3x3 + a4x4 + a5x5 \quad (1)$$

In Equation 1, x1 is a load value applied to the armrest. a1 is a coefficient of x1. Since the positive value calculation portion 212 calculates a smaller positive value when the load value of the driver applied to the armrest is large than when the load value of the driver applied to the armrest is small, a1 is a negative value.

In Equation 1, x2 is the proportion of a visual recognition time in a predetermined direction within a predetermined time. a2 is a coefficient of x2. Since the positive value calculation portion 212 calculates a larger positive value when the frequency of having a viewpoint in a predetermined direction is high than when the frequency of having a viewpoint in the predetermined direction is low, a2 is a positive value.

In Equation 1, x3 is a number based on the gripping position of the steering wheel. Here, x3 is set to a different value when the gripping position of the steering wheel is the first gripping position (the gripping position as shown in FIG. 3) and when the gripping position of the steering wheel is the second gripping position (the gripping position as shown in FIG. 4). For example, when the gripping position of the steering wheel is the first gripping position, x3 is set to number 1 (a positive fixed value), and when the gripping position of the steering wheel is the second gripping position, x3 is set to number 2 (a fixed value different from number 1). a3 is a coefficient of x3. Since the positive value calculation portion 212 calculates a larger positive value when the driver is gripping the steering wheel at the first gripping position than when the driver is gripping it at the second gripping position, number 1 is larger than number 2 and a3 is a positive value.

In Equation 1, x4 is the gripping pressure of the steering wheel (for example, the sum of the left hand gripping pressure and the right hand gripping pressure). a4 is a coefficient of x4. Since the positive value calculation portion 212 calculates a larger positive value when the gripping pressure of the driver is large than when the gripping pressure of the driver is small, a4 is a positive value.

In Equation 1, x5 is a number based on the position of the steering wheel in the longitudinal direction (an operation of the steering wheel in the longitudinal direction). Here, x5 is set to a different value when the position of the steering wheel in the longitudinal direction is on the front side (the position P2 in FIG. 5) (when the steering wheel is operated in the forward direction) and when the position of the steering wheel in the longitudinal direction is on the rear side (the position P1 in FIG. 5) (when the steering wheel is operated in a backward direction). For example, x5 is set to number 3 (a positive fixed value) when it is on the front side, and x5 is set to number 4 when it is on the rear side. a5 is a coefficient of x5. Since the positive value calculation portion 212 calculates a larger positive value when the position of the steering wheel in the longitudinal direction is on the front side than when it is on the rear side, number 3 is larger than number 4 and a5 is a positive value.

Note that Equation 1 shown above, and each coefficient (a1 to a5) and fixed values (numbers 1 to 4) are stored in, for example, the storage portion 220.

The lane keep assistance control portion 213 executes lane keep assistance control for guiding a steering operation of the driver so that the vehicle does not deviate from the traveling lane. The lane keep assistance control portion 213 outputs a control value of the lane keep assistance control to a traveling mechanism (not shown).

Figure 6:
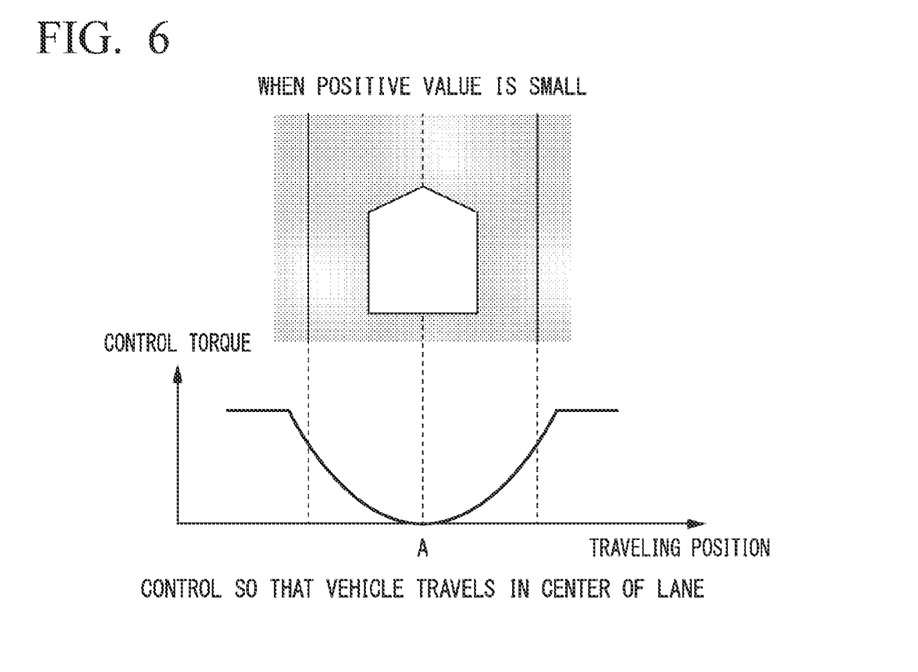
FIG. 6 is an explanatory diagram which describes a lane keep assistance control portion of a driving support device.
Figure 7:
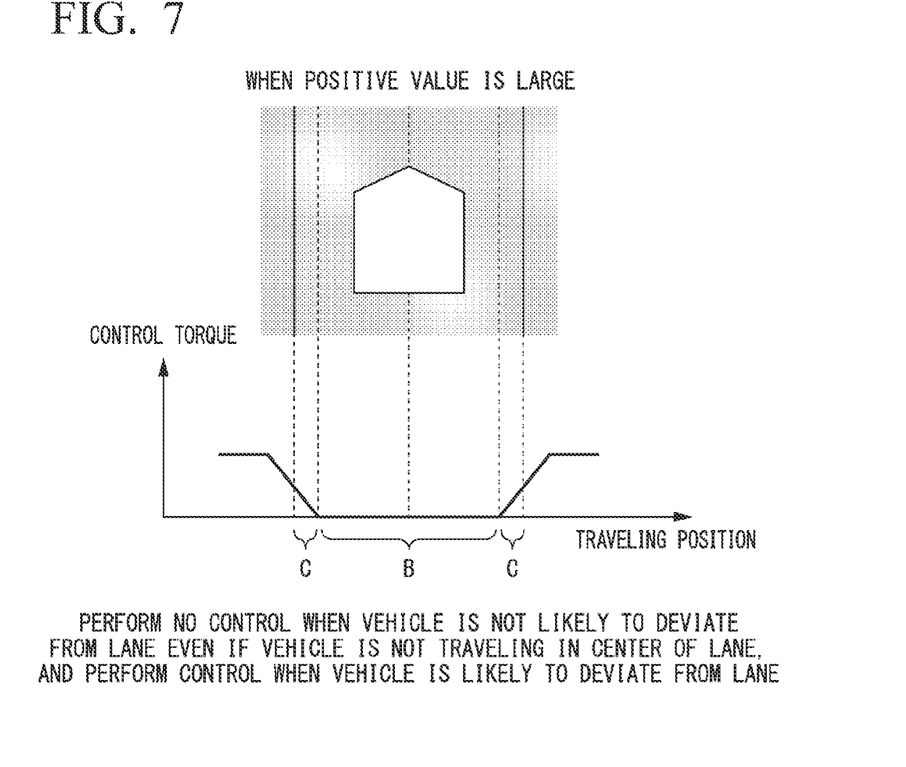
FIG. 7 is an explanatory diagram which describes the lane keep assistance control portion of the driving support device.
Figure 8:
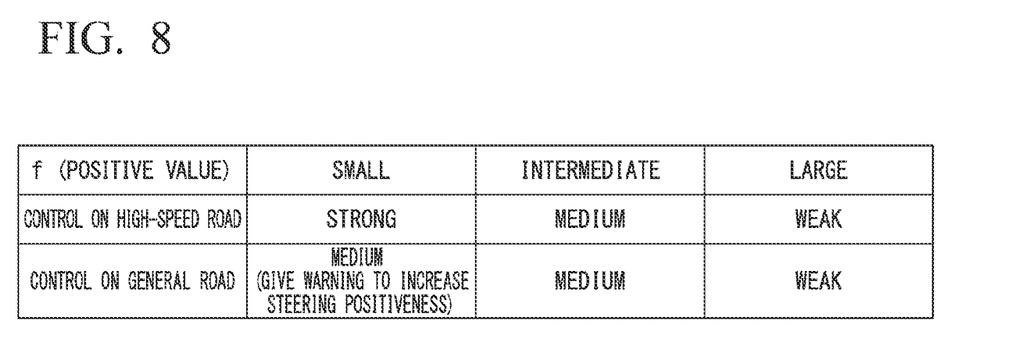
FIG. 8 is an explanatory diagram which describes the lane keep assistance control portion of the driving support device.

FIGS. 6 to 8 are explanatory diagrams which describe the lane keep assistance control portion 213 of the driving support device 200. FIG. 6 schematically shows the lane keep assistance control by the lane keep assistance control portion 213 when a positive value acquired from the positive value calculation portion 212 is small. FIG. 7 schematically shows the lane keep assistance control by the lane keep assistance control portion 213 when a positive value acquired from a positive value calculation portion 212 is large. The lane keep assistance control by the lane keep assistance control portion 213 is performed on the basis of a positive value calculated by the positive value calculation portion 212. Specifically, as shown in FIGS. 6 and 7, the lane keep assistance control portion 213 makes the lane keep assistance control weaker when a positive value is large than when a positive value is small. When a positive value is equal to or greater than a predetermined reference value, the positive value is called "large," and when a positive value is less than the predetermined reference value, the positive value is called "small." A predetermined reference value is stored in the storage portion 220.

When the positive value is small, the lane keep assistance control portion 213 performs control so that the vehicle travels in a center of a lane, as shown in FIG. 6. Specifically, the lane keep assistance control portion 213 outputs a control torque value of zero to the traveling mechanism when the vehicle is traveling in the center of the lane (A in FIG. 6) (or does not output the control torque value to the traveling mechanism), and output a large control value to the traveling mechanism according to a degree of deviation from the center. Note that the lane keep assistance control portion 213 outputs a control value as shown in FIG. 6 to the traveling mechanism even when the vehicle has deviated from the lane.

When the positive value is large, the lane keep assistance control portion 213, as shown in FIG. 7, does not perform control when the vehicle is not traveling in a position where it is likely to deviate from a lane (a position close to the lane) even if it is not traveling in the center of the lane, and when the vehicle is traveling in a position where it is likely to deviate from the lane, performs control such that it travels in the center (or a position close to the center). Specifically, the lane keep assistance control portion 213 outputs the control torque value of zero to the traveling mechanism (or does not output the control torque value to the traveling mechanism) when the vehicle is traveling at a position (a position within a range of B in FIG. 7) other than a position where the vehicle is likely to deviate from the lane (a position within a range of C in FIG. 7), and outputs a large control value according to the degree of deviation from the lane to the traveling mechanism as the control torque value when the vehicle is traveling at a position where it is likely to deviate from the lane. Note that the lane keep assistance control portion 213 outputs a control value as shown in FIG. 7 to the traveling mechanism even when the vehicle has deviated from the lane.

As shown in FIGS. 6 and 7, a control value output when the positive value is large is smaller than a control value output when the positive value is small. In other words, it is described that the lane keep assistance control portion 213 makes the lane keep assistance control weaker when the positive value is large than when the positive value is small, but specifically, a range in which lane keep assistance control is not performed (a range of the position of the vehicle) is wider when the positive value is large than when the positive value is small, and a control amount of lane keep assistance control performed when the positive value is large is less than a control amount of lane keep assistance control when the positive value is small.

In the description of FIGS. 6 and 7, an example in which the lane keep assistance control portion 213 executes lane keep assistance control on the basis of a positive value of two stages of large and small (a "large" positive value, a "small" positive value) is described, but lane keep assistance control may also be executed on the basis of any positive value of three or more stages. When the number of stages of a positive value is set to N, N−1 reference values are prepared (stored in the storage portion 220) to determine which of the N stages a positive value is.

In the following description, it is described that the lane keep assistance control portion 213 executes lane keep assistance control on the basis of a positive value of three stages of large, intermediate, and small (a "large" positive value, an "intermediate" positive value, a "small" positive value). That is, two reference values (a first reference value and a second reference value larger than the first reference value) are prepared. When a positive value acquired from the positive value calculation portion 212 is equal to or greater than the second reference value, the lane keep assistance control portion 213 determines that the positive value is a "large" positive value. When the positive value acquired from the positive value calculation portion 212 is equal to or greater than the first reference value and less than the second reference value, the lane keep assistance control portion 213 determines that the positive value is an "intermediate" positive value. When the positive value obtained from the positive value calculation portion 212 is less than the first reference value, the lane keep assistance control portion 213 determines that the positive value is a "small" positive value.

The lane keep assistance control portion 213 makes lane keep assistance control weaker in order of a "small" positive value, an "intermediate" positive value, and a "large" positive value. That is, the lane keep assistance control portion 213 sets a strength of the lane keep assistance control to "strong" when the positive value is "small." The lane keep assistance control portion 213 sets the strength of the lane keep assistance control to "medium" when the positive value is "intermediate." The lane keep assistance control portion 213 sets the strength of the lane keep assistance control to "weak" when the positive value is "large." The lane keep assistance control portion 213 outputs, for example, a control value as shown in FIG. 6 to the traveling mechanism when the strength of the lane keep assistance control is "strong" (that is, when the positive value is "small") The lane keep assistance control portion 213 outputs, for example, a control value as shown in FIG. 7 to the traveling mechanism when the strength of the lane keep assistance control is "weak" (that is, when the positive value is "large"). The lane keep assistance control portion 213 outputs, for example, a control value (not shown) between the control value as shown in FIG. 6 and the control value as shown in FIG. 7 to the traveling mechanism when the strength of the lane keep assistance control is "medium" (that is, when the positive value is "intermediate").

The lane keep assistance control portion 213 may acquire information indicating the type of a road on which the vehicle is traveling (a high-speed road or a general road) from the road determination portion 104, and make the lane keep assistance control stronger when the vehicle is traveling on a high-speed road than when traveling on a general road. For example, when the positive value is equal to or less than a predetermined value, the lane keep assistance control portion 213 may make the lane keep assistance control stronger when the vehicle is traveling on a high-speed road than when traveling on a general road. For example, when the positive value is "small," the lane keep assistance control portion 213 sets the strength of the lane keep assistance control to "medium" when the vehicle is traveling on a general road, and set the strength of the lane keep assistance control to "large" when traveling on a high-speed road.

The lane keep assistance control portion 213 may control an output of a warning regarding lane keep assistance control. For example, the lane keep assistance control portion 213 may output instruction information to a voice output portion (not shown) to output a voice message for giving a warning to increase steering positiveness when the positive value is "small" while the vehicle is traveling on a high-speed road, and may also output the instruction information to a display portion (not shown) to output a character or image for giving a warning to increase steering positiveness.

In summary, the lane keep assistance control portion 213 may execute, for example, lane keep assistance control as shown in FIG. 8. According to FIG. 8, when the positive value is "small," the lane keep assistance control portion 213 sets the strength of the lane keep assistance control to "strong" if a road on which the vehicle is traveling is a high-speed road, and sets the strength of the lane keep assistance control to "medium" if the road on which the vehicle is traveling is a general road. Furthermore, the lane keep assistance control portion 213 controls the output of a warning regarding lane keep assistance control if the road on which the vehicle is traveling is a general road. When the positive value is "intermediate," the lane keep assistance control portion 213 sets the strength of the lane keep assistance control to "medium" regardless of whether the road on which the vehicle is traveling is a high-speed road or a general road. When the positive value is "large," the lane keep assistance control portion 213 sets the strength of the lane keep assistance control to "weak" regardless of whether the road on which the vehicle is traveling is a high-speed road or a general road. Note that a table as shown in FIG. 8 may be stored in the storage portion 220.

[Operation of Driving Support Device]

Figure 9:
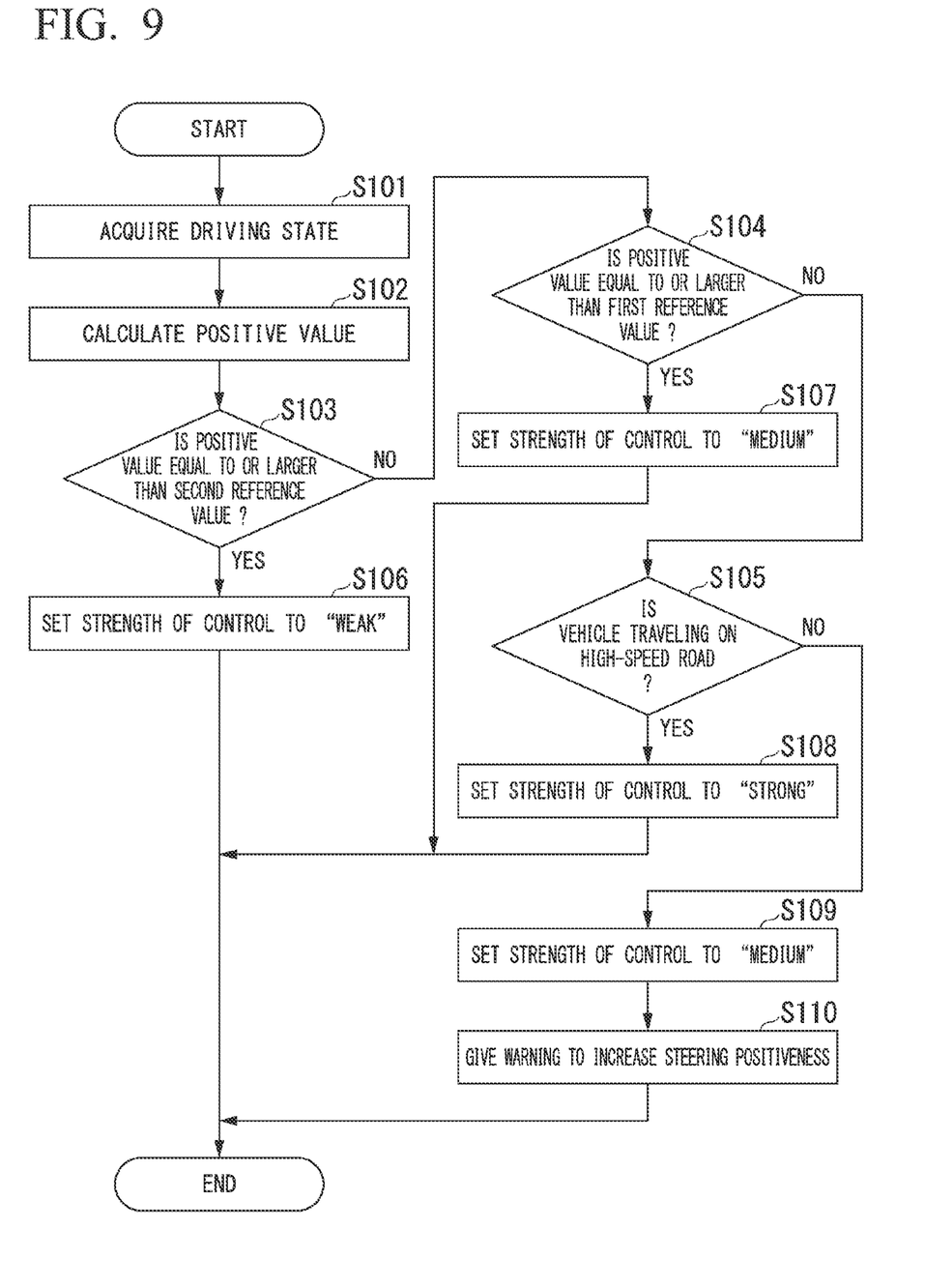
FIG. 9 is a flowchart which shows an operation of the driving support device.

Hereinafter, an example of an operation of the driving support device 200 will be described. FIG. 9 is a flowchart which shows the operation of the driving support device 200. The flowchart of FIG. 9 is repeatedly started while a vehicle is traveling. It is assumed that the lane keep assistance control portion 213 executes lane keep assistance control as shown in FIG. 8. In addition, it is also assumed that the second reference value is greater than the first reference value.

The driving state monitoring portion 211 acquires the driving state (step S101). Specifically, the driving state monitoring portion 211 acquires the driving state (the gripping position at which the driver grips the steering wheel, the gripping pressure of the driver on the steering wheel, the position of the steering wheel in the longitudinal direction) from the steering operation recognition portion 101, acquires the driving state (whether there is a viewpoint of the driver in a predetermined direction) from the viewpoint recognition portion 102, and acquires the driving state (a load value of the driver applied to the armrest) from the armrest load recognition portion 103.

Subsequently to step S101, the positive value calculation portion 212 calculates a positive value based on the driving state monitored (acquired) by the driving state monitoring portion 211 (step S102). For example, the positive value calculation portion 212 calculates the positive value according to Equation 1 described above.

Subsequently to step S102, the lane keep assistance control portion 213 determines whether the positive value calculated by the positive value calculation portion 212 is equal to or greater than the second reference value (step S103). That is, the lane keep assistance control portion 213 determines whether the positive value is "large."

When the positive value is not equal to or greater than the second reference value (NO in step S103), the lane keep assistance control portion 213 determines whether the positive value calculated by the positive value calculation portion 212 is equal to or greater than the first reference value (step S104). That is, the lane keep assistance control portion 213 determines whether the positive value is "intermediate."

When the positive value is not equal to or greater than the first reference value (NO in step S104), the lane keep assistance control portion 213 determines whether the vehicle is traveling on a high-speed road on the basis of the information indicating the type of a road acquired from the road determination portion 104 (step S105).

When the positive value is equal to or greater than the second reference value (YES in step S103), the lane keep assistance control portion 213 sets a strength of the control to "weak" (step S106). That is, the lane keep assistance control portion 213 sets the strength of the lane keep assistance control to "weak" when the positive value is "large." In this case, the lane keep assistance control portion 213 outputs, for example, a control value as shown in FIG. 7 to the traveling mechanism. Then, this flowchart ends. After the end, the processing is executed again from step S101.

When the positive value is equal to or greater than the first reference value (YES in step S104), the lane keep assistance control portion 213 sets the strength of the control to "medium" (step S107). That is, the lane keep assistance control portion 213 sets the strength of the lane keep assistance control to "medium" when the positive value is "intermediate." In this case, the lane keep assistance control portion 213 outputs, for example, a control value (not shown) between the control value shown in FIG. 6 and the control value shown in FIG. 7 to the traveling mechanism. Then, this flowchart ends. After the end, the processing is executed again from step S101.

When the vehicle is traveling on a high-speed road (YES in step S105), the lane keep assistance control portion 213 sets the strength of the control to "strong" (step S108). In other words, the lane keep assistance control portion 213 sets the strength of the lane keep assistance control to "strong" when the positive value is "small" and the vehicle is traveling on a high-speed road. In this case, the lane keep assistance control portion 213 outputs, for example, the control value shown in FIG. 6 to the traveling mechanism. Then, this flowchart ends. After the end, the processing is executed again from step S101.

When the vehicle is not traveling on a high-speed road (NO in step S105), the lane keep assistance control portion 213 sets the strength of the control to "medium" (step S109). In other words, the lane keep assistance control portion 213 sets the strength of the lane keep assistance control to "medium" when the positive value is "small" and the vehicle is traveling on a general road. In this case, the lane keep assistance control portion 213 outputs, for example, a control value (not shown) between the control value shown in FIG. 6 and the control value shown in FIG. 7 to the traveling mechanism.

Subsequently to step S109, the lane keep assistance control portion 213 gives a warning to increase steering positiveness (step S110). For example, the lane keep assistance control portion 213 may output instruction information to a voice output portion (not shown) such that it outputs a voice message for giving a warning to increase the steering positiveness, or may output instruction information to a display portion (not shown) such that it outputs characters or images for giving a warning to increase the steering positiveness. Then, this flowchart ends. After the end, the processing is executed again from step S101.

[Driving State that Reflects Driving State in Lane Keep Assistance Control]

In the description above, lane keep assistance control is executed on the basis of five types of driving states (the gripping position at which the driver grips the steering wheel, the gripping pressure of the driver on the steering wheel, the position of the steering wheel in the longitudinal direction, the viewpoint of the driver in a predetermined direction, and the load of the driver applied to the armrest). Specifically, the driving support device 200 calculates a positive value on the basis of the five types of driving states to reflect the five types of driving states in the lane keep assistance control. However, lane keep assistance control does not have to be executed on the basis of all of the five types of driving states described above. The same applies to [other methods of reflecting driving state in lane keep assistance control], which will be described below.

For example, the driving support device 200 may execute lane keep assistance control on the basis of two types or more of driving states including the gripping position at which the driver grips the steering wheel and one or more other types of driving states (one or more of the gripping pressure of the driver on the steering wheel, the position of the steering wheel in the longitudinal direction, the viewpoint of the driver in a predetermined direction, and the load of the driver applied to the armrest). That is, the driving support device 200 may calculate a positive value on the basis of two or more types of driving states including the gripping position at which the driver grips the steering wheel and one or more other types of driving states.

In addition, for example, the driving support device 200 may also execute the lane keep assistance control on the basis of one or more of four types of driving states (the gripping pressure of the driver on the steering wheel, the position of the steering wheel in the longitudinal direction, the viewpoint of the driver in a predetermined direction, and the load of the driver applied to the armrest), excluding the gripping position at which the driver grips the steering wheel. That is, the driving support device 200 may also calculate a positive value on the basis of the four types of driving states.

[Other Methods of Reflecting Driving State in Lane Keep Assistance Control]

In the description above, the driving support device 200 calculates a positive value on the basis of the five types of driving states so that the five types of driving states are reflected in the lane keep assistance control. However, if the five types of driving states are ultimately reflected in the lane keep assistance control, the driving support device 200 does not need to calculate a positive value on the basis of the five types of driving states.

For example, a positive value may be calculated on the basis of the four types of driving states, excluding the gripping position at which the driver grips the steering wheel, and a control value (a reference control value) of the lane keep assistance control may be changed (updated, corrected) on the basis of the gripping position at which the driver grips the steering wheel and the positive value calculated on the basis of the four types of driving states.

In addition, for example, a control value of the lane keep assistance control is calculated (determined) on the basis of the gripping position at which the driver grips the steering wheel, a positive value is calculated on the basis of the four types of driving states, excluding the gripping position at which the driver grips the steering wheel, and the control value of the lane keep assistance control calculated on the basis of the gripping position at which the driver grips the steering wheel may be changed according to the positive value calculated on the basis of the four types of driving states.

Moreover, for example, a first positive value may be calculated on the basis of the gripping position at which the driver grips the steering wheel, a second positive value may be calculated on the basis of the four types of driving states, excluding the gripping position at which the driver grips the steering wheel, the first positive value may be changed according to the second positive value, and a control value of lane keep assistance control may be calculated (determined) on the basis of the changed first positive value.

Moreover, for example, the first positive value may be calculated on the basis of one driving state, a second positive value may be calculated on the basis of another driving state, the first positive value is changed according to the second positive value, and the control value of lane keep assistance control may be calculated (determined) on the basis of the changed first positive value. Alternatively, a positive value may be calculated on the basis of one driving state and the calculated control value may be changed on the basis of another driving state. Alternatively, a positive value may be calculated on the basis of one driving state, and a control value based on the calculated control value may be changed on the basis of another driving state.

As described above, in the driving support device 200 of the embodiment of the present invention, the driving state monitoring portion 211 monitors a plurality of driving states (the gripping position at which the driver grips the steering wheel, the gripping pressure of the driver on the steering wheel, the position of the steering wheel in the longitudinal direction, the viewpoint of the driver in a predetermined direction, and the load of the driver applied to the armrest), the positive value calculation portion 212 calculates a positive value on the basis of the plurality of driving states, and the lane keep assistance control portion 213 executes lane keep assistance control on the basis of the positive value. Alternatively, as the driving support device 200 in a vehicle that executes lane keep assistance control on the basis of a control value according to the gripping position at which the driver grips the steering wheel, the driving state monitoring portion 211 monitors driving states different from the gripping position, the positive value calculation portion 212 calculates a positive value based on the driving states, and the lane keep assistance control portion 213 changes a control value according to the positive value.

As a result, the control value of lane keep assistance control that takes a plurality of driving states into account can be obtained, so that more accurate lane keep assistance can be performed and the driver can continue driving safely without discomfort. For example, even if the driver is gripping a lower part of the steering wheel, the driver may be concentrating on driving, and, in such a case, if the lane keep assistance control is made stronger, the driver may feel uncomfortable. However, the driving support device 200 of the embodiment of the present invention makes such a situation difficult to occur.

The positive value calculation portion 212 calculates a larger positive value when the steering wheel is operated in the forward direction than when it is not operated in the forward direction, and the lane keep assistance control portion 213 makes the lane keep assistance control weaker when the positive value is large than when the positive value is small. In other words, since positiveness is considered to be higher when the steering wheel is operated in the forward direction than when it is not operated, the driving support device 200 respects the positiveness of the driver with respect to steering and weakens the lane keep assistance control when the steering wheel is operated in the forward direction. Alternatively, as the driving support device 200 in a vehicle that executes lane keep assistance control on the basis of the control value according to the gripping position at which the driver grips the steering wheel, the driving state monitoring portion 211 is connected to the steering operation recognition portion 101 that recognizes that the steering wheel is operated in the longitudinal direction, and when there is an operation of the steering wheel in the forward direction, the positive value calculation portion 212 changes the positive value so as not to positively guide the steering (that is, increases the positive value).

As a result, the lane keep assistance is weakened on the basis of an intention of the driver (an intention to be seen in the operation of the steering wheel in the forward direction), so that the driver can safely continue driving without discomfort.

The positive value calculation portion 212 calculates a larger positive value when the frequency of having a viewpoint in a predetermined direction is high than when the frequency of having a viewpoint in a predetermined direction is low, and the lane keep assistance control portion 213 makes lane keep assistance control weaker when the positive value is large than when the positive value is small. In other words, since it is considered that positiveness of the driver with respect to steering is high when the frequency of having a viewpoint in a predetermined direction is high, the driving support device 200 respects the positiveness of the driver with respect to steering and weakens lane keep assistance control when the frequency of having a viewpoint in a predetermined direction is high. Alternatively, as the driving support device 200 in a vehicle that executes lane keep assistance control on the basis of the control value according to the gripping position at which the driver grips the steering wheel, the driving state monitoring portion 211 is connected to the viewpoint recognition portion 102 that recognizes a viewpoint of the driver, and the positive value calculation portion 212 changes the positive value according to the viewpoint.

As a result, the lane keep assistance is weakened on the basis of an intention of the driver (an intention to be seen from the viewpoint of the driver), so that the driver can continue driving safely without discomfort. For example, a high proportion of a visual recognition time for the door mirrors and rearview mirrors means that the driver drives with high positiveness, so that the lane keep assistance may be weakened.

In addition, the positive value calculation portion 212 calculates a smaller positive value when the load value applied to the armrest is large than when the load value applied to the armrest is small, and the lane keep assistance control portion 213 makes lane keep assistance control weaker when the positive value is large than when the positive value is small. In other words, the positiveness of the driver with respect to steering is considered to be lower when the load value applied to the armrest is large than when the load value applied to the armrest is small, so that the driving support device 200 makes lane keep assistance control stronger when the load value applied to the armrest is large. Alternatively, as the driving support device 200 in a vehicle that executes lane keep assistance control on the basis of the control value according to the gripping position at which the driver grips the steering wheel, the driving state monitoring portion 211 is connected to the armrest load recognition portion 103 that recognizes a load acting on the armrest, and the positive value calculation portion 212 changes the positive value according to the load value.

As a result, the lane keep assistance is strengthened on the basis of an intention of the driver (an intention to be seen from the load of the driver applied to the armrest), so that the driver can continue driving safely without discomfort. For example, a load acting on the armrest means that the driver is relaxed, so that the lane keep assistance may be strengthened.

In addition, the lane keep assistance control portion 213 makes lane keep assistance control stronger when the positive value is equal to or less than a predetermined value and the vehicle is traveling on a high-speed road than when the positive value is equal to or less than the predetermined value and the vehicle is traveling on a general road. In other words, when the positiveness of the driver with respect to steering is relatively low, the driving support device 200 makes the lane keep assistance control stronger when the vehicle is traveling on a high-speed road than when traveling on a general road. Alternatively, as the driving support device 200 in a vehicle that executes lane keep assistance control on the basis of the control value according to the gripping position at which the driver grips the steering wheel, the lane keep assistance control portion 213 may change the control value to be higher to positively guide a steering operation when the positive value is equal to or less than a predetermined value, and the vehicle is traveling on a high-speed road.

On a high-speed road, unlike a general road, a vehicle is likely to deviate from a traveling lane as the speed increases, but deviation from the traveling lane can be suppressed by increasing the control value and the driver can continue driving without discomfort.

As described above, in the driving support device 200 according to the embodiment of the present invention, more accurate lane keep assistance can be realized by appropriately changing the control value of lane keep assistance control on the basis of the positive value of the driver with respect to driving, and the driver can continue driving safely without discomfort.

As described above, a mode for carrying out the present invention has been described using the embodiments, but the present invention is not limited to such embodiments, and various modifications and replacements can be made within a range not departing from the gist of the present invention.

What is claimed is:

1. A driving support device comprising:
    a driving state monitoring portion configured to monitor presence or absence of an operation in a forward-rearward direction of a steering wheel of an occupant of a vehicle or a position of the steering wheel in the forward-rearward direction; and
    a lane keep assistance control portion configured to perform lane keep assistance control of guiding a steering operation of the occupant so that the vehicle does not deviate from a traveling lane based on a result of the monitoring of the driving state monitoring portion.

2. The driving support device according to claim 1, further comprising:
    a positive value calculation portion configured to calculate a positive value indicating a degree of positiveness of the occupant with respect to steering based on a plurality of driving states monitored by the driving state monitoring portion, wherein the driving state monitoring portion monitors an operation of the steering wheel in a forward-rearward direction as the driving state, the positive value calculation portion calculates a larger positive value when the steering wheel is operated in a forward direction than when the steering wheel is not operated in the forward direction, and the lane keep assistance control portion makes the lane keep assistance control weaker when the positive value is large than when the positive value is small.

3. The driving support device according to claim 1, further comprising:

a positive value calculation portion configured to calculate a positive value indicating a degree of positiveness of the occupant with respect to steering based on a plurality of driving states monitored by the driving state monitoring portion, wherein the driving state monitoring portion monitors a viewpoint of the occupant as the driving state, the positive value calculation portion calculates a larger positive value when a frequency of viewpoints of the occupant in a predetermined direction is high than when a frequency of viewpoints of the occupant in the predetermined direction is low, and the lane keep assistance control portion makes the lane keep assistance control weaker when the positive value is large than when the positive value is small.

4. The driving support device according to claim 1, further comprising:

a positive value calculation portion configured to calculate a positive value indicating a degree of positiveness of the occupant with respect to steering based on a plurality of driving states monitored by the driving state monitoring portion, wherein the driving state monitoring portion monitors a load value that acts on an armrest, the positive value calculation portion calculates a smaller positive value when the load value is large than when the load value is small, and the lane keep assistance control portion makes the lane keep assistance control weaker when the positive value is large than when the positive value is small.

5. The driving support device according to claim 1, further comprising:

a positive value calculation portion configured to calculate a positive value indicating a degree of positiveness of the occupant with respect to steering based on a plurality of driving states monitored by the driving state monitoring portion, wherein the lane keep assistance control portion makes the lane keep assistance control stronger when the positive value is equal to or less than a predetermined value and the vehicle is traveling on a high-speed road than when the positive value is equal to or less than the predetermined value and the vehicle is traveling on a general road.

6. A control method comprising:

by a computer, monitoring presence or absence of an operation in a forward-rearward direction of a steering wheel of an occupant of a vehicle or a position of the steering wheel in the forward-rearward direction; and performing lane keep assistance control of guiding a steering operation of the occupant so that the vehicle does not deviate from a traveling lane based on a result of the monitoring.

7. A computer-readable non-transitory storage medium including a program that causes a computer to:

monitor presence or absence of an operation in a forward-rearward direction of a steering wheel of an occupant of a vehicle or a position of the steering wheel in the forward-rearward direction of a steering wheel of an occupant of a vehicle; and perform lane keep assistance control of guiding a steering operation of the occupant so that the vehicle does not deviate from a traveling lane based on a result of the monitoring.

* * * * *